US009850100B2

(12) United States Patent
Blondiau et al.

(10) Patent No.: US 9,850,100 B2
(45) Date of Patent: Dec. 26, 2017

(54) ARRANGEMENT OF A MONITORING SENSOR IN AN ESCALATOR OR IN A MOVING WALKWAY

(71) Applicant: Inventio AG, Hergiswil (CH)

(72) Inventors: Dirk Blondiau, Vienna (AT); Gerhard Stoiber, Gösting (AT); Günter Steindl, Vienna (AT); Jürg Burri, Hirschthal (CH); Michael Matheisl, Vösendorf (AT)

(73) Assignee: INVENTO AG, Hergiswil NW (CH)

( * ) Notice: Subject to any disclaimer, the term of this patent is extended or adjusted under 35 U.S.C. 154(b) by 0 days.

(21) Appl. No.: 15/106,350

(22) PCT Filed: Nov. 14, 2014

(86) PCT No.: PCT/EP2014/074641
§ 371 (c)(1),
(2) Date: Jun. 20, 2016

(87) PCT Pub. No.: WO2015/090764
PCT Pub. Date: Jun. 25, 2015

(65) Prior Publication Data
US 2016/0368741 A1 Dec. 22, 2016

(30) Foreign Application Priority Data

Dec. 20, 2013 (EP) .................................. 13198751

(51) Int. Cl.
*B66B 29/08* (2006.01)
*B66B 25/00* (2006.01)
(Continued)

(52) U.S. Cl.
CPC ............ *B66B 25/00* (2013.01); *B66B 21/025* (2013.01); *B66B 21/12* (2013.01); *B66B 29/08* (2013.01); *B66B 19/007* (2013.01)

(58) Field of Classification Search
CPC ....... B66B 25/00; B66B 29/00; B66B 29/005; B66B 29/08
(Continued)

(56) References Cited

U.S. PATENT DOCUMENTS 5,923,005 A * 7/1999 Blondiau ................ B66B 25/00
187/317
6,334,522 B2 * 1/2002 Haruta .................... B66B 25/00
198/322
(Continued)

FOREIGN PATENT DOCUMENTS

EP 1541519 B1 1/2008
JP H0812238 A 1/1996
(Continued)

*Primary Examiner* — James R Bidwell
(74) *Attorney, Agent, or Firm* — William J. Clemens; Shumaker, Loop & Kendrick LLP

(57) ABSTRACT

An escalator or a moving walkway has two access regions, each with a comb plate, and a conveying region arranged between the access regions. The conveying region extends between the two comb plates of the access regions. At least one projection projects into the conveying region at at least one stationary part of the escalator or moving walkway. At least one monitoring sensor is arranged at least partly in the at least one projection.

16 Claims, 2 Drawing Sheets

(51) Int. Cl.
   *B66B 21/02*   (2006.01)
   *B66B 21/12*   (2006.01)
   *B66B 19/00*   (2006.01)

(58) Field of Classification Search
   USPC ........................................ 198/322, 323, 324
   See application file for complete search history.

(56) References Cited

U.S. PATENT DOCUMENTS

| | | | | |
|---|---|---|---|---|
| 6,988,607 | B2* | 1/2006 | Blondiau | B66B 25/00 198/322 |
| 7,775,339 | B2* | 8/2010 | Ogimura | B66B 27/00 198/323 |
| 8,708,130 | B2* | 4/2014 | De Coi | B66B 25/00 198/322 |
| 2007/0084696 | A1* | 4/2007 | Yoshida | B66B 27/00 198/321 |

FOREIGN PATENT DOCUMENTS

| | | |
|---|---|---|
| JP | 2009067533 A | 4/2009 |
| KR | 20090028393 A | 3/2009 |

* cited by examiner

ARRANGEMENT OF A MONITORING SENSOR IN AN ESCALATOR OR IN A MOVING WALKWAY

FIELD

The invention relates to an arrangement of a monitoring sensor in an escalator or in a moving walkway.

BACKGROUND

Monitoring sensors can transmit a multiplicity of operating data to the control of an escalator or a moving walkway in order to optimize the operation of these items of equipment for transport of persons and/or to increase the operating safety thereof.

In the case of known controls for escalators and moving walkways the drive is, for example, switched off when the escalator is unused or operated at reduced speed in an energy-saving mode termed 'crawl travel'. When users approach the escalator then, for example, when passing through a light barrier or passing an infrared sensor a pulse is triggered and the drive switched on or the speed of the drive increased. After a predetermined period of time has elapsed, at the earliest after departure of the last user from the escalator, the drive is switched off again. The monitoring sensor necessary for that purpose is, as described in, for example, WO 98/18711 A1, accommodated in a column or post, which is arranged laterally of the access region, so as to be able to reliably detect the users.

EP 1 541 519 B1 discloses an arrangement of at least one radar monitoring sensor serving for detection of users approaching an escalator or a moving walkway. This monitoring sensor is concealed behind an opaque handrail entry cap so as not to be the target of vandalism.

The afore-described arrangements of monitoring sensors have the disadvantage that they are unable to monitor the entire access region. Due to the arrangement in a separate post or in the handrail entry cap of the passenger transport device areas of the respective access region to be monitored are necessarily not detected. In particular, the areas near the comb plate cannot be reached by the protection cone of the monitoring sensor, since parts of the balustrade or the balustrade base obstruct or interfere with detection. This can have the consequence that more elderly users who remain in these areas for a longer period of time are no longer recognizable for control of the escalator or the moving walkway and therefore a desired reaction of the control such as, for example, starting of the step belt or plate belt does not happen.

SUMMARY

It is therefore an object of the present invention to propose an arrangement for at least one monitoring sensor which makes it possible to better monitor the associated access region.

This object is fulfilled by an escalator or a moving walkway having two access regions each with a respective comb plate and a conveying region arranged between the access regions. The conveying region extends in its length between the two comb plates of the access regions. The conveying region is in addition bounded transversely to its length or length direction by the balustrades and balustrade bases of the escalator or the moving walkway. This means that the cross-section of the conveying region is bounded by the surfaces of the balustrade bases and balustrades directed towards the step belt or plate belt. At least one projection projecting into the conveying region is arranged at at least one stationary part of the escalator or moving walkway, wherein at least one monitoring sensor is arranged at least partly in the at least one projection. The feature "projection" is used in the present specification as a synonym for a convexity, protrusion, bulge, bump or attachment with largely rounded contours. Since the balustrade bases are contours bounding the conveying region, they do not represent projections protruding into the conveying region in the sense of the invention.

For reasons of safety, components protruding into the conveying region are not permitted, because there is a risk that, for example, objects or even the clothing or limbs of users could be caught thereat. Accordingly, a control element or a sensor may protrude only, for example, approximately 3 millimeters into the conveying space. However, these 3 millimeters do not allow accommodation of a monitoring sensor in such a way that the detection cone thereof can also detect objects along the wall in or at which the monitoring sensor is installed. A projection protruding into the conveying region and allowing at least partial accommodation of a monitoring sensor thus represents a departure from current teaching. This is because the projection has to project significantly more than the allowed three millimeters so that the detection cone of the monitoring sensor can also detect at least a wall such as, for example, a balustrade panel or a base plate, adjoining the monitoring sensor.

The feature "projection" describes a region which projects into the conveying region and the contour of which, at least in the conveying direction, does not have an edge—which is reachable by users—having an angle of 90°>α>0° included between the edge or the surface and the conveying direction. For preference, all edges of the projection are rounded and, insofar as present, the surfaces thereof optionally cambered so that the projection at least in the conveying direction has a continuous profile. Insofar as the projection is formed directly at a component of the escalator or the moving walkway extending parallel to the conveying direction of the escalator or the moving walkway the transitions between the contour of the projection and a planar surface of the component can also be formed by way of transition radii to be continuous.

Through the projection projecting into the conveying region it is possible to create, for a monitoring sensor, an ideal, sufficiently protruding position making it possible to reliably detect and monitor a region, which is to be monitored, in the entire width of the conveying region or in the entire of the access region from the comb plate. This is hardly possible with a monitoring sensor arranged at, for example, the side of the balustrade remote from the conveying region and thus outside the conveying region. In the case of such an arrangement the monitoring sensor would have to detect the users through the balustrade. In that event, interferences could arise if radar sensors are used as the monitoring sensor, the interferences being caused by, for example, steel cables serving as tensile carriers in the circulating handrail and by metal covers of the balustrade base. Such an arrangement is also unsuitable for infrared sensors, CCD cameras and TOF cameras, since located between the access region to be detected and the monitoring sensor is, for example, a glass panel of the balustrade to which dirt can adhere, so that in the case of excessive contamination the monitoring sensor is, so to speak, blind. Moreover, a monitoring sensor with such an arrangement can be immediately recognized by potential vandals.

The arrangement of the monitoring sensor in a projection projecting into the conveying region also has economic advantages. Due to the sufficiently projecting position which the projection makes possible an entire access region and/or the conveying region can be detected by only one monitoring sensor. Without the protruding arrangement of the monitoring sensor use would have to be made of plurality of monitoring sensors in order to be able to completely detect an associated access region. However, a solution with the plurality of monitoring sensors is connected with a substantial costs outlay. The costs outlay concerns not only the multiplicity of monitoring sensors, but also the wiring thereof to the control, the processing of multiple signals as well as the increased outlay on maintenance. Not to be forgotten is the increased susceptibility to fault of the entire control system of the escalator or moving walkway if the number of monitoring sensors is increased. However, for reasons of redundancy, obviously also two or more, optionally also differently operating, monitoring sensors can be assigned to an access region of the escalator or the moving walkway.

The monitoring sensor preferably serves for monitoring an associated access region of the escalator or the moving walkway. The access region to be monitored usually extends in its width defined by two balustrades at the escalator or the moving walkway and in its length running from the comb plate up to at least the ends of the two balustrades arranged in the vicinity of the access region to be monitored. In order to achieve this the position of the projection can be arranged to be set back in the conveying region to such an extent from the access region to be monitored that the entire access region can be covered by a detection cone of the monitoring sensor.

By virtue of the projecting position a detection cone of the monitoring sensor can also detect objects or users along a wall in which or at which the projection with the monitoring sensor is arranged. The aforesaid wall can be, for example, a balustrade, a balustrade panel, a base wall, a base plate and the like bounding the clearance profile, which is described further below, of the escalator or the moving walkway.

Gap-free detection of the entire access region up to the comb plate enables excellent, user-oriented control of the drive with which the step belt of the escalator or the plate belt of the moving walkway is connected. If, for example, a more elderly user wishes to enter an escalator or a moving walkway he or she moves slowly onto the step belt or plate belt and remains usually for a few tenths of a second on the comb plate before he or she ventures to step onto a step. Through detection of the entire access region the situation can be correctly detected and the speed of the step belt or plate belt adapted to, for example, the requirements of the more elderly user until he or she has left the detected region of the monitoring sensor by going beyond the comb plate in the direction of the conveying region.

By contrast, users who are in a hurry and accordingly pass quickly through the access region have a need for the step belt to have normal conveying speed when they go beyond the comb plate. Through detection of the entire access region sufficient time is available to increase the speed of the step belt up to when the hurrying user goes past the comb plate. If persons remain too long directly in front of the comb plate this can be an indication that children who are playing or vandals are in the access region. In order to minimize a potential risk of injury in this case, for example, the drive can be completely switched off or the speed of the step belt or plate belt reduced.

As already mentioned further above monitoring sensors can be the target of pranks or vandalism if they are easily recognizable. In order to disguise the projection a device protruding into the conveying region can be arranged at the projection. This can be, for example, a lighting body by which the comb plate can be illuminated.

The projection can be even better concealed if the device extends over at least a quarter of the length of the conveying region and is perceived as a contour of the conveying region influencing the clearance profile. The projection can be even better concealed if the device extends over the length of the conveying region. The clearance profile in the sense of the present specification corresponds with the cross-section of the conveying region, wherein the clearance profile ends at the height of the circulating handrail and in the case of an escalator or a moving walkway of the relevant kind is open towards the top. Correspondingly, the space termed conveying region is also limited in its height by this circulating handrail even when users and objects to be conveyed extend upwardly from the conveying region.

If a monitoring sensor in a projection is associated with each of the two access regions the device preferably extends between the two projections of the two access regions. As a result, the two projections can be disguised by only one device.

There are numerous possibilities of arranging in the clearance profile of a conveying region a projection and the device, which is connected with the projection, at a stationary part of the escalator or moving walkway.

In one embodiment of the invention the stationary part can be a balustrade base, the projection can be a start element, which is arranged at the balustrade base, of a deflector brush and the device can be a deflector brush. The deflector brush, for example as disclosed in EP 1 262 441 B1, is in itself a commonplace and frequently employed means of keeping the shoes of users away from the base plate of the escalator or the moving walkway.

In a further embodiment of the invention the stationary part can be a balustrade, the device can be a handrail guide of the balustrade and the projection can be constructed at the handrail guide.

In a further embodiment of the invention the stationary part can be balustrade lighting means, the device can be a cover of the balustrade lighting means and the projection can be constructed at the cover.

In a further embodiment of the invention the stationary part can be a balustrade base, the device can be step belt lighting means or plate belt lighting means and the projection can be a start element of the step belt lighting means or plate belt lighting means.

The monitoring sensor can be completely arranged in the projection. However, this is not necessary. If the projection is open towards an interior space of the escalator or the moving walkway a sensor head of the monitoring sensor can be arranged in the projection and a sensor housing of the monitoring sensor can be arranged in the interior space, which is delimited by claddings, of the escalator or moving walkway. Moreover, the electronic evaluating and control system of the monitoring sensor can be arranged in the sensor housing and/or in a separate housing and/or in the control of the escalator.

All sensors suitable for detection of persons or users of the escalator or moving walkway, such as, for example, a radar sensor, an infrared sensor, a laser scanner, a CCD camera or—preferably—a TOF camera, can be used as the monitoring sensor. TOF cameras and 3D camera systems which measure distance by the transit time method (time-of-flight sensor). For that purpose the scene or the scanning space is illuminated by a light pulse in the camera measures, for every image point, the time which the light needs to go to the object and back again. The time needed is directly proportional to distance. The camera thus supplies, for every image point, the distance of the object imaged thereon. The principle corresponds with laser scanning with the advantage that an entire scene can be recorded at once and it does not have to be scanned.

Since TOF cameras can be used in a distance range from a few decimeters up to approximately 40 meters they are particularly suitable as a monitoring sensor for the access regions of an escalator or moving walkway. The currently achievable distance resolution is in that case approximately 1 centimeter and lateral resolutions reach approximately 200×200 pixels. The cameras can currently supply up to 160 images per second. The simplest form of TOF camera operates with light pulses which are generated by means of, for example, an infrared LED. The illumination is switched on for a brief moment and the light pulse illuminates the scene and is reflected at the objects. The lens of the camera collects this light and images the scene on the sensor. Depending on the respective distance the light incident on the individual pixels experiences a delay which can be evaluated as distance information.

By virtue of the high number of images per second which a monitoring sensor of the aforesaid kind can supply it is possible to implement entirely new operating methods taking into account the different requirement of users.

For example, user-oriented methods of operating an escalator or a moving walkway can be implemented in the control concept if at least one monitoring sensor arranged in the projection is present. The monitoring signals generated by the monitoring sensor can, for example, be evaluated in a control of the escalator or moving walkway with regard to whether a user rapidly approaches the comb plate, whether a user slowly approaches the comb plate or whether a person remains for a longer period of time in the access region monitored by the monitoring sensor.

These evaluated data can be utilized for control of the drive of the escalator or the moving walkway. If a user rapidly approaches the comb plate the speed of the step belt or plate belt can, for example, be increased from a slow conveying speed to a normal conveying speed or standard conveying speed before the user has passed the comb plate. If the step belt or plate belt already has a normal conveying speed and a user rapidly approaches the comb plate the normal conveying speed can be maintained.

If a user approaches the comb plate of the access region slowly or hesitantly a stationary step belt or plate belt can be brought to a slow conveying speed which is maintained until the slow user has left the conveying region. If the speed of the step belt or plate belt is already at a slow conveying speed and the slow conveying speed can be maintained until the slow user has left the conveying region or has gone beyond the comb plate of the access region adjoining the conveying region. This helps, in particular, small children and users, who are handicapped with regard to, for example, movement or sight, to go onto the step belt or plate belt and safely leave again.

The speed of the drive can obviously also be controlled in such a way that if a user slowly approaches the comb plate of the access region the speed of the step belt or plate belt is reduced from a normal conveying speed to a slow conveying speed and is increased from a slow conveying speed to a normal conveying speed only when the slow user has left the conveying region again.

To the extent that country-specific standards permit it, further operating methods can additionally be implemented in the control of the escalator or moving walkway. If, for example, a user approaches the comb plate slowly or hesitantly the speed of the step belt or plate belt can be increased from a slow conveying speed to a normal conveying speed only when the slow user has passed the comb plate.

Moreover, the speed of the drive can also be controlled in such a way that if a user approaches a comb plate slowly the speed of the step belt or plate belt is reduced from a normal conveying speed to a slow conveying speed and is increased from a slow conveying speed to a normal conveying speed only when the slow user has passed the comb plate.

In order to facilitate departure of this user from the step belt or plate belt the control can reduce the speed of the step belt or plate belt from a normal conveying speed back to a slow conveying speed before persons identified as slow users have reached the comb plate of that access region at which they will leave the escalator or moving walkway.

If a person remains for a longer period of time in the access region monitored by the monitoring sensor this can be an indication of children who are playing or of vandals. In order to avoid accidents, in these cases, for example, the step belt or plate belt can be stopped or at least the conveying speed reduced.

If, now, several users of the escalator or the moving walkway enter the access region thereof it is additionally possible in the case of presence of a slow user and a fast user in the access region to maintain a slow conveying speed or reduce the conveying speed to this until the slow user has passed the comb plate of that access region by way of which he or she leaves the escalator or the moving walkway.

An existing escalator or moving walkway can obviously also be modernized in that at least one projection projecting into the conveying region can be arranged at at least one stationary part of the escalator or moving walkway so that at least one monitoring sensor can be arranged at least partly in the at least one projection.

DESCRIPTION OF THE DRAWINGS

The at least one projection projecting into the conveying region and arranged at a stationary part of the escalator or the moving walkway is explained in more detail in the following by way of examples and with reference to the drawings, in which.

DETAILED DESCRIPTION

Figure 1:
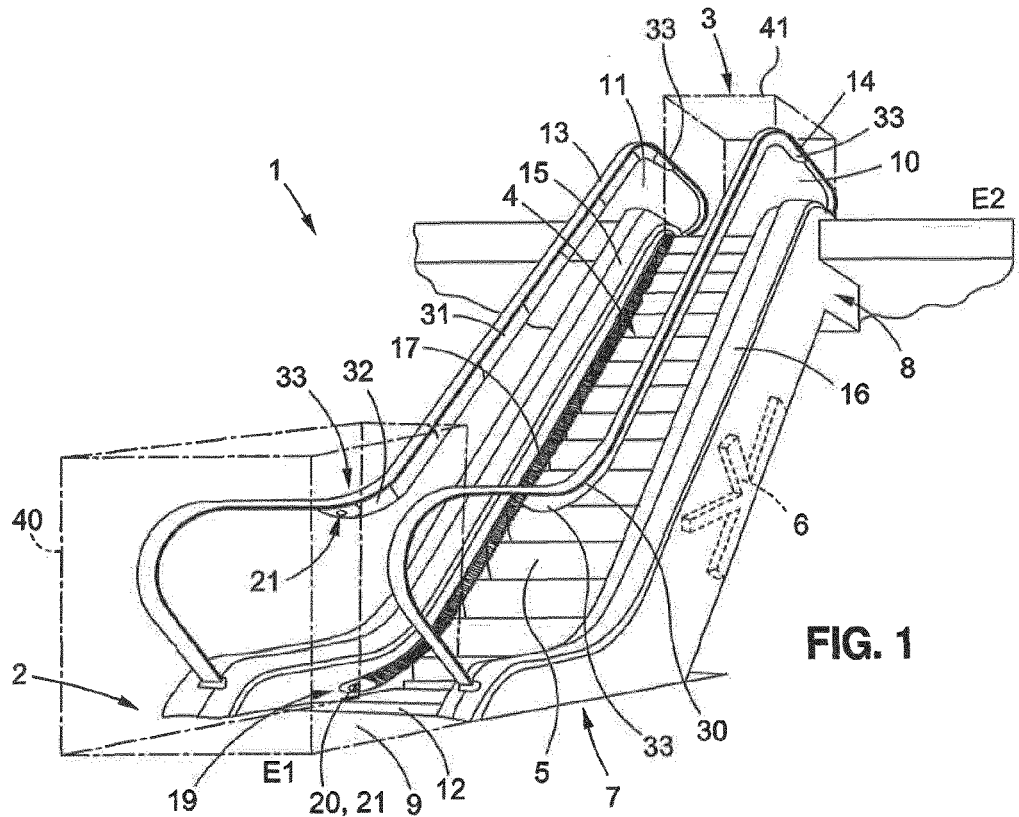
FIG. 1 shows, in three-dimensional illustration, an escalator with at least one projection for a monitoring sensor.

FIG. 1 shows, in three-dimensional illustration, an escalator 1 which connects a first floor E1 with a second floor E2. The escalator 1 has two access regions 2, 3 each with a respective comb plate 12 (only one visible) and a conveying region 4 arranged between the access regions 2, 3. The conveying region 4 extends in the length thereof between the comb plates 12 of the two access regions 2, 3. The escalator 1 includes a support structure 6 or framework 6 with two deflecting regions 7, 8 (not visible), between which a step belt 5 is guided to circulate. The deflecting regions 7, 8 of the step belt 5 are respectively concealed under a floor covering 9 of the two access regions 2, 3. Extending laterally of the conveying region 4 are two balustrades 10, 11 each having a circulating handrail 13, 14. The balustrades 10, 11 are respectively connected at the lower ends thereof with the support structure 6 by means of a balustrade base 15, 16.

Arranged laterally of the respective balustrade bases 15, 16 are deflector brushes 17, 18 (only one deflector brush 17 visible in FIG. 1), which project substantially towards the adjacent balustrade base 15, 16 and thus into the conveying region 4. The deflector brushes 17, 18 or the devices 17, 18 protruding into the conveying region 4 extend substantially over the length of the conveying region 4. A start element 19 directed towards the adjacent access region 2, 3 is arranged at the balustrade base 15, 16 at each end of the deflector brushes 17, 18. The start element 19 has a cavity 20 for accommodation of a monitoring sensor 21 and thus represents a projection 19 projecting into the conveying region 4. A handrail guide concealed by the handrail 13, 14 extends over the length of the conveying region 4 below each handrail 13, 14 and includes balustrade lighting means 30, 31 protruding into the conveying region 4 or a device 30, 31 protruding into the conveying region 4. The balustrade lighting means 30, 31 has a cover 32, at each of the two ends of which is arranged a respective projection 33 serving as a closure and projecting into the conveying region. A monitoring sensor 21 can also be arranged in this projection 33.

The regions marked with dot-dashed lines in the two access regions 2, 3 represent a possible detection space 40, 41 of a monitoring sensor 21 arranged in the afore-mentioned projections 19, 33. The height of the detection spaces 40, 41 is to be understood only as exemplifying and depends substantially on the kind of monitoring sensor 21. The two detection spaces 40, 41 illustrated in FIG. 1 as cubes could, for example, be monitored by means of a TOF camera serving as monitoring sensor 21. The data detected by the TOF camera can be filtered in the evaluation on the basis of its distance information, in which connection boundaries, so to speak, of the detection spaces 40, 41 can be defined.

Figure 2:
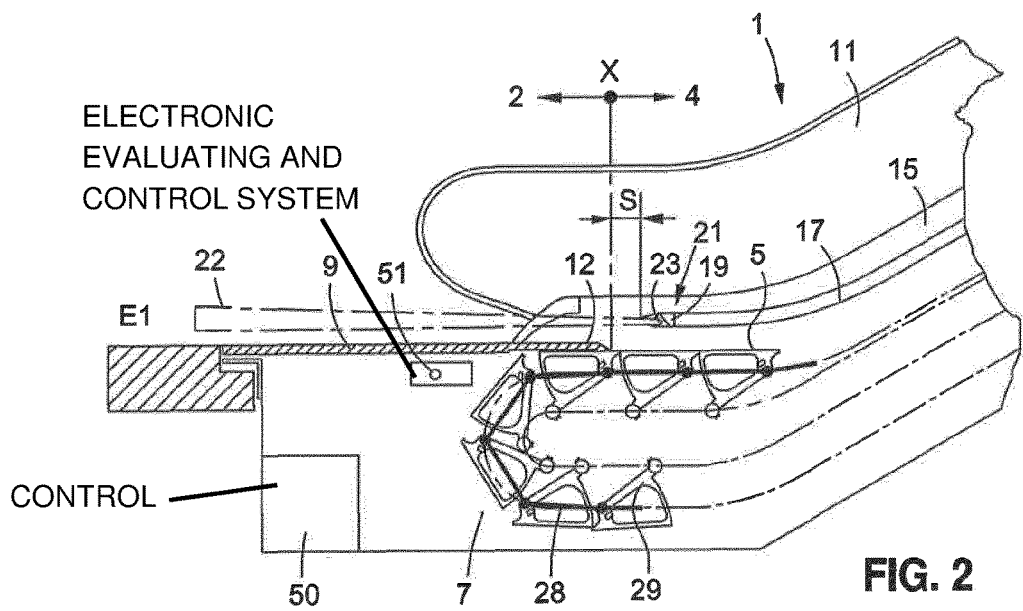
FIG. 2 shows, in schematic illustration, one of the two access regions of the escalator illustrated in FIG. 1, in sectional side view.

FIG. 2 shows schematically in sectional side view the access region 2, which is arranged in the first floor E1 of the escalator 1 illustrated in FIG. 1. Accordingly, in the following the same reference numerals are used as in FIG. 1. Due to the sectional side view, only one of the two balustrades 11 is illustrated. The sole difference from the escalator 1 illustrated in FIG. 1 is that no balustrade lighting means is arranged at the balustrade 11.

In FIG. 2 the deflecting region 7 of the step belt 5 below the base cover 9 can be clearly seen. The step belt 5 has traction means 28 at which steps 29 are arranged. The comb plate 12 is arranged in the access region 2 and closes the base cover 9. The end of the comb plate 12 directed towards the conveying region also represents the boundary X between the access region 2 and the conveying region 4.

The deflector brush 17 arranged at the balustrade base 15 comprises a start element 19. In the present embodiment a monitoring sensor 21 is arranged in the start element 19 serving as projection 19. The boundaries, which are illustrated by dot-dashed lines, of the detection cone 22 of this monitoring sensor 21 are to be understood as only exemplifying.

Obviously, monitoring sensors 21 can also be used which have a substantially larger opening angle of the detection cone 22 and detect not only the limbs of users. Such monitoring sensors 21 can then also detect the body size of users so that, for example, children can be distinguished from adults. These data can then be processed appropriately to situation in a control 50 for activation of a drive (not illustrated) of the escalator 1 so that, for example, the step belt 5 in the case of presence of children in the monitored access region 2 can be stopped if at least one adult is not at the same time present in this access region 2. Depending on the respective size and type of the monitoring sensor 21 the electronic evaluating and control system 51 thereof can be arranged separately from its sensor head 23. In the present embodiment, this is accommodated in a separate housing arranged below the base cover 9. For the sake of better clarity connecting lines between the sensor head 23, the electronic evaluation and control system 51 and the control 50 are not illustrated.

The deflector brush 17 extends substantially over the length of the conveying region 4. This is essentially for the reason that the start element 19 is arranged at a spacing S from the boundary X in the conveying region 4 so that the entire width of the comb plate 12 can be covered by the detection cone 22 of the monitoring sensor 21. This is apparent particularly from FIG. 3 described in the following.

Figure 3:
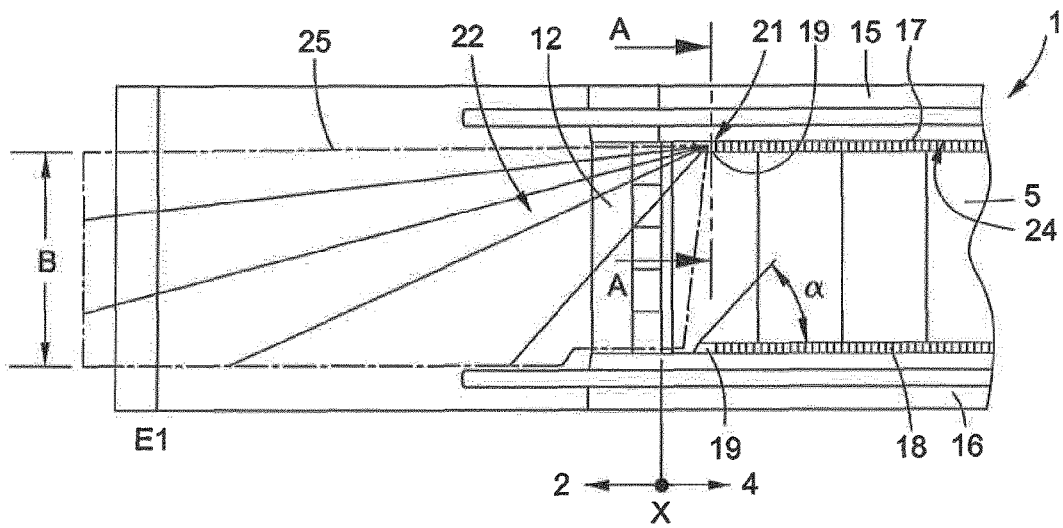
FIG. 3 shows, in schematic illustration, the access region of FIG. 2 in plan view.

FIG. 3 shows in schematic plan view the access region 2, which is illustrated in FIG. 2, of the escalator 1. By virtue of the arrangement of the projection 19 in the conveying region 4, the entire width B of the access region 2 can be monitored from the boundary X defined by the comb plate 12. The projection 19 projecting into the conveying region 4 and in the form of a start element 19 of a deflector brush 17 also enables detection along that base wall 24 of the balustrade base 15 at which the projection 19 together with the monitoring sensor 21 is arranged. The projection area 25 of the detection cone 22 of the monitoring sensor 21 is illustrated, by way of example, by means of dot-dashed line.

In addition, the second deflector brush 18 already mentioned in the description with respect to FIG. 1 and arranged at the balustrade base 16 is illustrated in FIG. 3. The second deflector brush 18 or device 18 is connected at each of the ends thereof with a start element 19 constructed as a projection 19. These projections 19 can remain unoccupied, since the detection cone 22 of the monitoring sensor 21 arranged on the opposite side of the conveying region 4 can monitor the entire access region 2. Obviously, for reasons of, for example, redundancy at least one monitoring sensor 21 can also be arranged in these projections 19.

It is also illustrated by way of these projections 19 that the contour thereof has, at least in the conveying direction, no edge or surface—having an angle $90°>\alpha>0°$ included between the edge or the surface and the conveying direction the step belt 5—reachable by users. For preference, all edges of the projection 19 are rounded and, insofar as present, the surfaces thereof are optionally cambered so that the projection 19 at least in the conveying direction has a continuous contour which is, so to speak, stream lined.

Figures 4, 5:
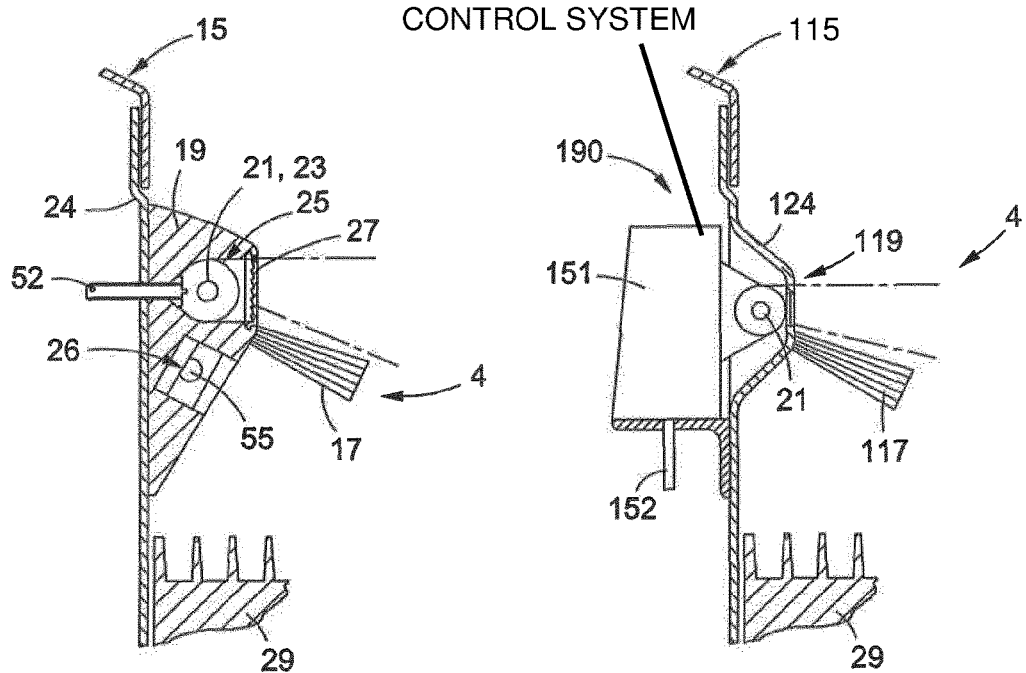
FIG. 4 shows a section, which is illustrated to enlarged scale and extends transversely to the length direction of the escalator, along a sectional plane, which is denoted in FIG. 3 by A-A, through a projection in a first embodiment.
FIG. 5 shows a section, which is illustrated to enlarged scale and extends transversely to the length direction of the escalator, along a sectional plane, which is denoted in FIG. 3 by A-A, through a projection in a second embodiment.

A cross-section, which extends transversely to the longitudinal direction of the escalator 1 is illustrated to enlarged scale in FIG. 4, the sectional plane A-A of which is indicated in FIG. 3. FIG. 4 shows the projection 19, which is designed as a start element 19 of the deflector brush 17, in a first embodiment. The projection 19, which by way of example is constructed as a shock-resistant plastics material part, can be fastened to the base wall 24 of the balustrade base 15. For the sake of better clarity, a part of a step 29 is additionally illustrated.

A first cavity 25, in which the monitoring sensor 21 or at least the sensor head 23 thereof is accommodated, is formed in the projection 19. The first cavity 25 is closed off towards the conveying region 4 by means of a transparent cover 27. If the monitoring sensor 21 is, for example, a radar sensor, the radar waves of which are capable of penetrating opaque plastics material parts, the transparent cover 27 can obviously be eliminated and the first cavity 25 closed towards the conveying region 4 by a housing wall of the projection 19. Then, for example, the monitoring sensor 21 has to be inserted into the first cavity 25 from the side directed towards the base wall 24. A cable 52 leads from the monitoring sensor 21 to the electronic evaluating and control system (not illustrated) of the monitoring sensor 21.

A second cavity 26, in which lighting means 55 is arranged, is additionally recognizable in the section A-A. This lighting means 55 can, for example, be directed onto the comb plate 12 which is illustrated in the afore-described FIGS. 1 to 3, so as to illuminate this and thereby make noticeable to a user the boundary X between the respective access region 2, 3 and the conveying region 4. The second cavity 26 can, however, also form the start or termination of step belt lighting means extending over the length of the deflector brush 17, wherein a lighting means strip 55 is arranged below the deflector brush 17 in a cavity 26 extending over the length of the deflector brush 17.

The afore-described step belt lighting means can obviously also be arranged in the conveying region 4 without a deflector brush 17.

A cross-section, which extends transversely to the length direction of the escalator 1, of a projection 119 is illustrated to enlarged scale in FIG. 5, the sectional plane A-A thereof being indicated in FIG. 3. FIG. 5 shows the projection 119, which is formed as a start element 119 of the deflector brush 117, in a second embodiment. The second embodiment of the projection 119 projecting into the conveying region 4 differs from the first projection 19, which is shown in FIG. 4, in that this is formed directly on the base wall 124 and is not, as shown in FIG. 3, attached to the base wall 24 as a separate component. For the sake of better clarity, a part of a step 29 is similarly illustrated in FIG. 5.

Projections 119 of this kind can be produced, by way of example, by means of a deep-drawing process or stamping process, in which case, for example, a base plate forming the base wall 124 of the balustrade base 115 can be appropriately reshaped. By virtue of the projection 119 formed to be bump-like there is available for installation of a monitoring sensor 21 not only a cavity bounded by the volume of the projection 119, but a substantially larger internal space 190 of the escalator 1. The electronic evaluating and control system 151 can thereby also be arranged in the interior space 190 in the immediate vicinity of the monitoring sensor 21. A cable 152 leads from the electronic evaluating and control system 151 of the monitoring sensor 21 to the control 50, which is illustrated in FIG. 2, of the escalator 1.

Although the invention has been described by the illustration of specific embodiments on the basis of an escalator it is obvious that numerous further variants of embodiment can be created with knowledge of the present invention. For example, the same embodiments are also usable in a moving walkway.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An escalator or moving walkway having two access regions, each with a comb plate, and a conveying region arranged between the access regions, which conveying region extends between the two comb plates and is bounded longitudinally by balustrades and balustrade bases, comprising:
    at least one projection projecting into the conveying region and arranged at at least one stationary part of the escalator or moving walkway; and
    at least one monitoring sensor arranged at least partly in the at least one projection for detecting objects, wherein a position of the at least one projection relative to an associated one of the access regions to be monitored is so arranged that the associated one of the access regions is covered in a width defined by the balustrades and the balustrade bases, and in a length extending from an associated one of the comb plates to at least ends of the balustrades arranged in a vicinity of the associated one of the access regions, by a detection cone of the at least one monitoring sensor, and wherein the associated one of the comb plates is included in the detection cone of the at least one monitoring sensor.

2. The escalator or moving walkway according to claim 1 wherein the at least one monitoring sensor monitors the associated one of the access regions.

3. The escalator or moving walkway according to claim 1 wherein the objects are detectable in the detection cone of the at least one monitoring sensor along a wall in or at which the at least one projection with the at least one monitoring sensor is arranged.

4. The escalator or moving walkway according to claim 1 wherein a device projecting into the conveying region is arranged at the at least one projection.

5. The escalator or moving walkway according to claim 4 wherein the device extends over at least a quarter of a length of the conveying region.

6. The escalator or moving walkway according to claim 5 wherein at least one monitoring sensor in a projection is associated with each of the two access regions and the device extends between the two projections.

7. The escalator or moving walkway according to claim 5 wherein the at least one stationary part is a balustrade base, the device is a deflector brush and the at least one projection is a start element of the deflector brush arranged at the balustrade base.

8. The escalator or moving walkway according to claim 5 wherein the at least one stationary part is a balustrade, the device is a handrail guide of the balustrade and the at least one projection is formed at the handrail guide.

9. The escalator or moving walkway according to claim 5 wherein the at least one stationary part is balustrade lighting means, the device is a cover of the balustrade lighting means and the at least one projection is formed at the cover.

10. The escalator or moving walkway according to claim 5 wherein the at least one stationary part is a balustrade base, the device is step belt lighting means or plate belt lighting means and the at least one projection is a start element of the step belt lighting means or the plate belt lighting means.

11. The escalator or moving walkway according to claim 1 wherein a sensor head of the at least one monitoring sensor is arranged in the at least one projection and a sensor housing of the at least one monitoring sensor is arranged in an interior space delimited by a wall of the escalator or the moving walkway.

12. The escalator or moving walkway according to claim 1 wherein the at least one monitoring sensor is a radar sensor, an infrared sensor, a laser scanner, a charge-coupled-device camera or a time-of-flight camera.

13. A method of modernizing an existing escalator or an existing moving walkway, comprising the steps of:
arranging at least one projection to project into a conveying region at at least one stationary part of the escalator or the moving walkway; and
arranging at least one monitoring sensor at least partly in the at least one projection, wherein a position of the at least one projection relative to an associated access region to be monitored is so arranged that the associated access region is covered in a width defined by balustrades and balustrade bases and in a length extending from a comb plate to at least ends of the balustrades arranged in a vicinity of the associated access region, by a detection cone of the at least one monitoring sensor, and wherein the comb plate is included in the detection cone of the at least one monitoring sensor.

14. A method of operating an escalator or a moving walkway having two access regions, each with a comb plate, and a conveying region arranged between the access regions, which conveying region extends between the two comb plates and is bounded longitudinally by balustrades and balustrade bases, and at least one monitoring sensor arranged in a projection projecting into the conveying region adjacent an associated one of the comb plates, comprising the steps of:
evaluating monitoring signals generated by the at least one monitoring sensor with respect to whether a user rapidly approaches the associated one of the comb plates, whether the user slowly approaches the associated one of the comb plates, or whether the user remains for a longer period of time in one of the access regions monitored by the at least one monitoring sensor; and
operating the escalator or moving walkway in response to the evaluated monitoring signals, wherein a position of the projection relative to the one of the access regions monitored is so arranged that the one of the access regions is covered in a width defined by the balustrades and the balustrade bases, and in a length extending from the associated one of the comb plates to at least ends of the balustrades arranged in a vicinity of the one of the access regions, by a detection cone of the at least one monitoring sensor, and wherein the associated one of the comb plates is included in the detection cone of the at least one monitoring sensor.

15. The method of operating an escalator or a moving walkway according to claim 14 wherein at least one of the following steps is carried out:
if the user rapidly approaches the associated one of the comb places the speed of a step belt or a plate belt is increased from a slow conveying speed to a normal conveying speed before the user has gone past the associated one of the comb plates in a direction of the conveying region;
if the user slowly approaches the associated one of the comb plates the step belt or the plate belt is brought to a slow conveying speed, which speed is maintained until the user has left the conveying region;
if the user slowly approaches the associated one of the comb plates and the speed of the step belt or the plate belt is already at the slow conveying speed the slow conveying speed is maintained until the user has left the conveying region;
if the user slowly approaches the associated one of the comb plates the speed of the step belt or the plate belt is reduced from the normal conveying speed to the slow conveying speed and is increased from the slow conveying speed to the normal conveying speed only when the user has left the conveying region;
if the user slowly approaches the associated one of the comb plates the speed of the step belt or the plate belt is increased from the slow conveying speed to the normal conveying speed only when the user has gone past the associated one of the comb plates;
if the user slowly approaches the associated one of the comb plates the speed of the step belt or the plate belt is reduced from the normal conveying speed to the slow conveying speed and is increased from the slow conveying speed to the normal conveying speed only when the user has gone past the associated one of the comb places; and
if the user remains for a longer period of time in the access region monitored by the at least one monitoring sensor the step belt or the plate belt is stopped.

16. The method of operating an escalator or a moving walkway according to claim 14 wherein in a presence of a slow user and a fast user a slow conveying speed is maintained or a normal conveying speed is reduced until the slow user has left the conveying region.

* * * * *